United States Patent
Onabe et al.

(10) Patent No.: US 7,360,038 B2
(45) Date of Patent: Apr. 15, 2008

(54) STORAGE CONTROL SYSTEM AND METHOD

(75) Inventors: Kenji Onabe, Odawara (JP); Koji Arai, Odawara (JP); Atsushi Ishikawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 251 days.

(21) Appl. No.: 11/227,244

(22) Filed: Sep. 16, 2005

(65) Prior Publication Data

US 2006/0259712 A1    Nov. 16, 2006

(30) Foreign Application Priority Data

May 12, 2005    (JP)    ............. 2005-139294

(51) Int. Cl.
*G06F 12/00*    (2006.01)
(52) U.S. Cl. .............. 711/154; 711/4; 711/5; 711/100; 711/111; 711/112; 711/114; 710/11; 710/14; 710/74
(58) Field of Classification Search ........... 711/154, 711/4–5, 100, 111–112, 114, 156; 710/11, 710/14, 74
See application file for complete search history.

(56) References Cited

U.S. PATENT DOCUMENTS 5,802,394 A * 9/1998 Baird et al. .............. 710/5
6,247,103 B1 * 6/2001 Kern et al. ............... 711/162
6,292,878 B1 * 9/2001 Morioka et al. ........... 711/209
6,542,954 B1 * 4/2003 Aruga ...................... 710/316
6,654,831 B1 * 11/2003 Otterness et al. .......... 710/74
6,915,381 B2 * 7/2005 Fujie et al. ................ 711/114
2003/0221077 A1    11/2003 Ohno et al.
2004/0117562 A1 *  6/2004 Wu et al. .................. 711/147

FOREIGN PATENT DOCUMENTS

JP    2003-150318    11/2001
JP    2004-5370      11/2002

* cited by examiner

*Primary Examiner*—Sanjiv Shah
*Assistant Examiner*—Zhuo H Li
(74) *Attorney, Agent, or Firm*—Reed Smith LLP; Stanley P. Fisher, Esq.; Juan Carlos A. Marquez, Esq.

(57) ABSTRACT

A storage control system comprises a first controller connected through a first access route to a first storage; a second controller connected through a second access route to a second storage device; a third controller connected through a third access route to the first storage device; and a fourth controller connected through a fourth access route to the second storage device. For example, if the access destination in accordance with the access instruction received from the host device is the second storage device, the first controller outputs an access request to the second controller. The second controller accesses the second storage device through the second access route in accordance with this access request.

3 Claims, 6 Drawing Sheets

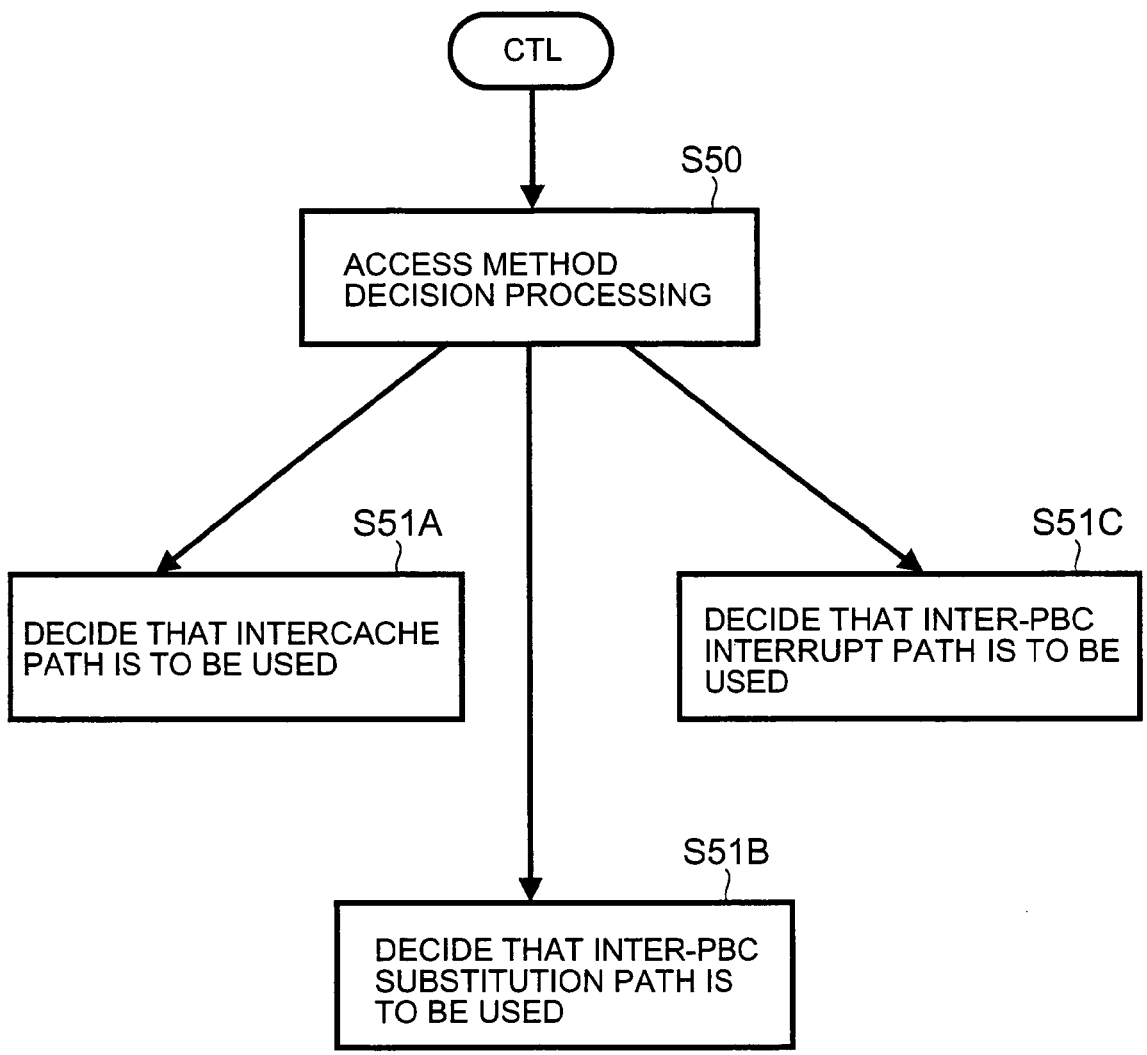

STORAGE CONTROL SYSTEM AND METHOD

CROSS REFERENCE TO PRIOR APPLICATION

This application relates to and claims priority from Japanese Patent Application No. 2005-139294, filed on May 12, 2005, the entire disclosure of which is incorporated herein by reference.

FIELD OF THE INVENTION

The present invention relates to technology for controlling access to a plurality of storage devices.

BACKGROUND OF THE INVENTION

A known example of a storage control system comprising a plurality of disk drives is the storage control system described in Laid-open Japanese Patent Application No. 2003-150318. This storage control system comprises two disk array controllers that control access to a plurality of disk devices.

SUMMARY OF THE INVENTION

In the technology described above, two controllers are provided in the storage control system. However, it is thought that users expect the appearance of storage control systems of even higher processing capability than this storage control system.

An object of the present invention is therefore to provide a storage control system and method of higher processing capability than this storage control system and method employing two controllers.

Further objects of the present invention will become clear from the following description.

A storage control system according to a first aspect of the present invention comprises: a first controller connected through a first access route with one or more first storage devices; a second controller connected through a second access route with one or more second storage devices; a third controller connected through a third access route with the one or more first storage devices; and a fourth controller connected through a fourth access route with the one or more second storage devices.

The first controller is connected with the second controller and a host device that transmits an access instruction and receives the access instruction from the host device, and if the access destination in accordance with the access instruction is the second storage device, the first controller outputs an access request that is a request to access the second storage device to the second controller. The second controller accesses the second storage device through the second access route in response to an access request from the first controller in accordance with the access request. It should be noted that, in this case, if for example the first controller comprises a first memory, the second controller comprises a second memory and an inter-memory path is formed between the first memory and second memory, the first controller can receive data regarding the writing target from the host device, and write the received data in the first memory and this data can then be written in the second memory through the inter-memory path. In this case, the second controller can acquire the data written to the second memory and can write this data to the second storage device through the second access route.

The third controller is connected with the fourth controller and the host device and receives the access instruction from the host device, and if the access destination in accordance with the access instruction is the second storage device, the third controller outputs an access request that is a request to access the second storage device to the fourth controller. The fourth controller accesses the second storage device through the fourth access route in response to an access request from the third controller in accordance with the access request.

In a first embodiment of this storage control system, the first controller is connected with both the second controller and the fourth controller and, if the access destination that is accessed in accordance with the access instruction is the second storage device, the controller having the smaller load of the second controller and the fourth controller is selected, and the access request is output to the selected controller.

In a second embodiment of this storage control system, in the first embodiment, the second controller and the fourth controller respectively comprise memory capable of storing data and can thus accumulate in the memory the number of unprocessed access instructions, of the access instructions that the controller itself has received. In this case, the first controller selects the controller that has the smallest such number of unprocessed access instructions accumulated in the memory.

In a third embodiment of this storage control system, the first controller stores information relating to the storage devices capable of being accessed by each controller and the controller can determine whether the access destination that is to be accessed in accordance with the access instruction is the first storage device or the second storage device by referencing the information.

In a fourth embodiment of this storage control system, in the third embodiment, the first to fourth controllers respectively comprise memory capable of storing data, and a transfer control unit that controls transfer of data stored in the memory to a separate memory through a data transfer path. Each memory comprises a first memory region that stores first access control information constituting information relating to a first storage device capable of being accessed by the first controller, a second memory region that stores second access control information constituting information relating to the second storage device capable of being accessed by the second controller, a third memory region that stores third access control information constituting information relating to the first storage device capable of being accessed by the third controller, and a fourth memory region that stores fourth access control information constituting information relating to the second storage device capable of being accessed by the fourth controller. The first to fourth controllers respectively write the access control information constituting information relating to the storage device that they are themselves capable of accessing in the memory region corresponding to the controller itself. The transfer control units, if access control information is written to a memory region corresponding to the controller provided by the transfer control unit itself, write this access control information through the data transfer path also in a memory region of a separate memory corresponding to this memory region.

In a fifth embodiment of this storage control system, the first controller comprises a first memory capable of storing data and a first transfer control unit that controls the transfer of data. The second controller comprises a second memory capable of storing data and a second transfer control unit that controls data transfer and that is connected with the first transfer control unit through a data transfer path. The first controller or the second controller writes data in a memory of the controllers and also writes this data in a separate memory of the controllers through the data transfer path, under the control of the first transfer control unit and the second transfer control unit.

Specifically, for example the first controller, if the access instruction is a read instruction, requests reading of data by the second controller. The second controller, in response to the request, reads data from the second storage device through the second access route and writes the data that has been thus read to the second memory and, by controlling the second transfer control unit and the first transfer control unit, writes the data that has been written to the second memory through the data transfer path to the first memory. The first controller transmits the data that has been written in the first memory to the host device.

Also, if for example the access instruction is a write instruction, the first controller receives data from the host device and writes this in the first memory and controls the second transfer control unit and the first transfer control unit to write the data that has been written in the first memory to the second memory through the data transfer path. The second controller writes the data that has been written in the second memory to the second storage device.

The first controller secures a memory region in the first memory and can write data to the secured memory region. The first controller, if for example the access instruction is a read instruction, can release the secured memory region with a prescribed timing when data written in the first memory has been transmitted to the host device, or, if the access instruction is a write instruction, can release the secured memory region when a report to the effect that data has been written to the second storage device is received from the second controller.

In this fifth embodiment, the construction of the first controller may be applied to the third controller and the construction of the second controller may be applied to the fourth controller.

In a sixth embodiment of this storage control system, in the fifth embodiment, a first switch device is provided between the first access control unit and the one or more first storage devices and a second switch device is provided between the second access control unit and the one or more second storage devices, connected through a separate data transfer path with the first switch device. In this case, the second controller controls the second switch device and can access the first storage device through the first switch device and the first access route.

In a seventh embodiment of this storage control system, in the sixth embodiment, the second controller is connected with the host device and detects failure of access of one or more second storage devices and, if this is detected, if an access instruction for accessing the first storage device has been received from the host device, controls the second switch device so that the first storage device can be accessed through the first switch device and the first access route.

A storage control system according to a second aspect of the present invention comprises: a first controller connected through a first fibre channel loop with one or more first storage devices; a second controller connected through a second fibre channel loop with one or more second storage devices; a third controller connected through a third fibre channel loop with the one or more first storage devices; and a fourth controller connected through a fourth fibre channel loop with the one or more second storage devices.

The first controller is connected with the second controller and the fourth controller and a host device that transmits an access instruction. Also, the first controller stores access control information, which is information relating to which storage devices can be accessed by the controllers. Also, if the first controller receives the access instruction from the host device and the access destination in accordance with the access instruction is the second controller, the first controller can determine that the controllers that are capable of accessing the second storage device are the second controller and the fourth controller by referencing the access control information. Also, the first controller can select the controller whose load is smallest of the second controller and fourth controller that are thus identified and can output an access request that is a request to access the second storage device to the selected controller.

The second controller or the fourth controller that has thus received the access request responds to the access request from the first controller and, in accordance with the access request, can access the second storage device through the second fibre channel loop or the fourth fibre channel loop.

A storage control method according to a third aspect of the present invention comprises the following steps (A) to (F).

(A) The first controller connected through a first access route with one or more first storage devices receives the access instruction from the host device that transmits the access instruction.

(B) If the access destination in accordance with the access instruction is a second storage device, the first controller outputs an access request that is a request to access the second storage device to the second controller that is connected through a second access route with one or more second storage devices.

(C) In response to the access request from the first controller, the second controller, in accordance with the access request, accesses the second storage device through the second access route.

(D) A third controller that is connected through a third access route with the one or more first storage devices receives the access instruction from the host device.

(E) If the access destination in accordance with the access instruction is the second storage device, the third controller outputs the access request to a fourth controller connected through a fourth access route with the one or more second storage devices.

(F) The fourth controller accesses the second storage device through the fourth access route in accordance with the access request in response to the access request from said third controller.

BRIEF DESCRIPTION OF THE DRAWINGS

FIG. 6 is a diagram of a modified example of an embodiment of the present invention.

DETAILED DESCRIPTION OF THE PREFERRED EMBODIMENT

An embodiment of the present invention is described below with reference to the drawings.

Figure 1:
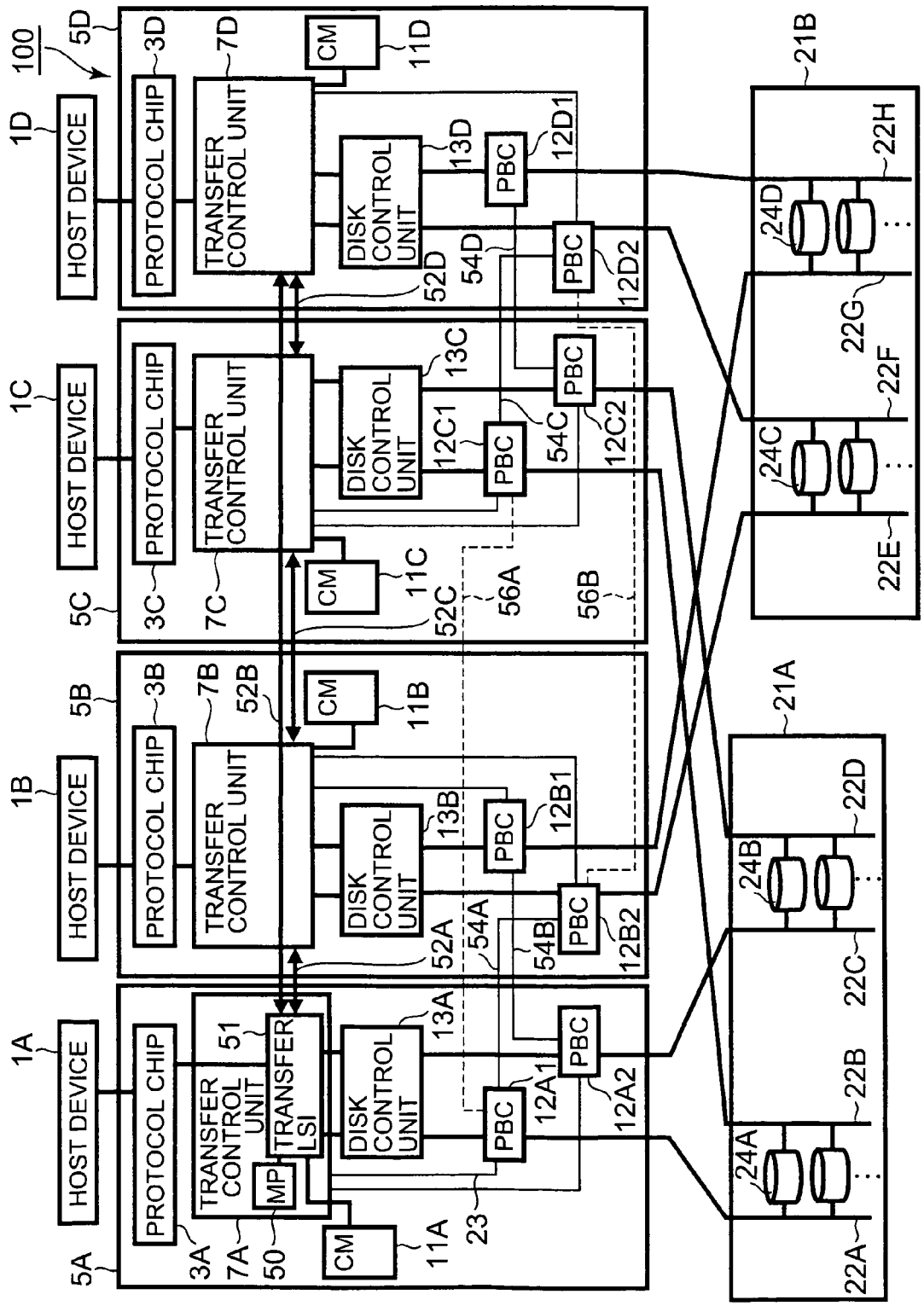
FIG. 1 shows the layout of a storage control system according to an embodiment of the present invention.

FIG. 1 shows the layout of a storage control system according to an embodiment of the present invention. It should be noted that, in the following description, if a plurality of elements of the same type are present, each element may be indicated by a combination of a general reference symbol and a suffix or may sometimes be indicated simply by the general reference symbol. In the case of indication simply by the general reference symbol, at least one of a plurality of elements of the same type is indicated.

A storage control system 100 according to this embodiment is for example a RAID (redundant arrays of inexpensive disks) system wherein a plurality of storage devices are arranged in an array. This storage control system 100 comprises multiplexed controllers (hereinbelow abbreviated as "CTL") 5A, 5B, 5C and 5D and a plurality (for example two) of storage device group enclosures 21A and 21B. In each storage device group enclosure 21 there are provided a plurality of storage devices 24. As storage devices 24 there may be employed for example hard disks, optical disks such as DVDs (digital versatile disks), magnetic tape recording media, or semiconductor memories.

Each controller 5 is connected so as to be capable of accessing a prescribed storage device 24 through an access route such as for example an FC-AL (fibre channel arbitration loop, hereinbelow referred to as a "fibre channel loop") 22 in accordance with a prescribed protocol and controls access to this storage device 24. The access routes to the storage devices 24 are duplicated.

Specifically, for example the controller 5A is capable of accessing one or more storage devices 24A through a fibre channel loop 22A and is capable of accessing one or more storage devices 24B through a fibre channel loop 22C. When the controller 5A receives an I/O request from a host device 1A that transmits an I/O request (input/output request, such as for example a data write request or data read request), if the access destination specified by the I/O request that has been received is to storage device 24A or 24B, the storage device 24A or 24B can be accessed through the fibre channel loop 22A or 22C. It should be noted that the controller 5A can receive the I/O request through a communication network (for example SAN (storage area network)) or a private circuit or the like (the same applies to the other host devices and controllers). Also, the storage device 24A and 24B can be accommodated in the same storage device group enclosure 21A.

Also, for example the controller 5B can access one or more storage devices 24C through a fibre channel loop 22E and can access one or more storage devices 24D through a fibre channel loop 22G. When it receives an I/O request from a host device 1B, the controller 5B, if the access destination specified by the received I/O request is the storage device 24C or 24D, can access the storage device 24C or 24D through the fibre channel loop 22E or 22G. It should be noted that the storage devices 24C and 24D can be accommodated in a separate, common storage device group enclosure 21B. The storage device group enclosures 21A and 21B are not mutually connected but exist separately.

Also, for example, the controller 5C can access one or more storage devices 24A through a fibre channel loop 22B and can access one or more storage devices 24B through a fibre channel loop 22D. If the controller 5B has received an I/O request from a host device 1C, if the access destination specified by the received I/O request is the storage device 24A or 24B, the controller 5B can access the storage device 24A or 24B through the fibre channel loop 22B or 22D.

Also, for example the controller 5D becomes capable of accessing one or more storage devices 24C through the fibre channel loop 22F and becomes capable of accessing one or more storage devices 24D through the fibre channel loop 22H. If the controller 5D has received an I/O request from the host device 1D, if the access destination specified by the received I/O request is the storage device 24C or 24D, the controller 5D can access the storage device 24C or 24D through the fibre channel loop 22F or 22H.

The above is an outline of the layout of the storage control system 100. It should be noted that a plurality of controllers 5 could be connected with a single host device 1 or a plurality of host devices 1 could be connected with a single controller 5.

The layout of this storage control system 100 is described in more detail below.

The characteristic features of the controllers 5A, 5B, 5C and 5D are the same, so the controller 5A will be described as a typical example and the layout of the other controllers 5B, 5C and 5D will also be described as appropriate. The controller 5A comprises a protocol chip 3A, cache memory (hereinbelow sometimes abbreviated as "CM") 11A, and a disk control unit 13A and a transfer control unit 7A.

The protocol chip 3A controls the protocol of communication that is conducted between the host device (for example personal computer or server machine) 1A and the storage control system 100.

The CM 11A temporarily stores the data that is exchanged between the host device 1A and the storage control system 100. Also, the CM 11A stores an access table, to be described, for each CTL 5. The layout of the CM 11A is described in detail later.

Under control from an MP (microprocessor) 50, to be described, the disk control unit 13A accesses the storage device 24A or 24B through the fibre channel loop 22A or 22C.

The transfer control unit 7A performs control of transfer of data that is to be written (hereinbelow referred to as write data) received from the host device 1A and controls the transfer of data that is to be read (hereinbelow referred to as read data) from the storage device 24. The transfer control unit 7A is connected for example with a CTL detection signal line (not shown) and is connected with the transfer control unit 7B of another CTL 5B that is connected through an intercache path 52A with the storage devices 24C, 24D that cannot be accessed by the CTL 5A through the fibre channel loop 22A or 22C. Also, the transfer control unit 7A is connected with the storage devices 24C, 24D that cannot be accessed as described above, or is connected with the transfer control unit 7D of another CTL 5D through another intercache path 52B. With this construction, the transfer control unit 7A detects installation or removal of a CTL 5B through a CTL detection signal line or can monitor the condition of the CTL 5B (for example whether a fault has occurred therein or not) (the same applies to the transfer control unit 7B). Also, the transfer control unit 7A can transmit prescribed instructions (for example an instruction to save the cache region, an instruction to write data or an instruction to read data) to the transfer control unit 7B or 7D through the intercache path 52A or 52B. Also, the transfer control unit 7A can arrange that data written to the CM 11A is written to the CM 11B or 11D by transferring this data to the transfer control unit 7B or 7D through the intercache path 52A or 52B. Also, the transfer control unit 7A can write data received from the transfer control unit 7B or 7D to the CM 11A and can request the data control unit 13A to write the data that has thus been written in the CM 11 to the storage device 24A or 24B through the fibre channel loop 22A or 22C.

The transfer control unit 7A comprises for example a transfer LSI (Large Scale Integration) 51 and an MP (microprocessor) 50. The transfer LSI 51 is an LSI that transfers data such as write data or read data. The transfer LSI 51 is connected through an intercache path 52A with a transfer LSI (not shown) in the transfer control unit 7B and is connected through an intercache path 52B with a transfer LSI (not shown) in the transfer control unit 7D. The MP 50 can control the operation of the CTL 5A. For example, the MP 50 transmits or receives prescribed instructions through the intercache path 52 or transmits data written to the CM 11A through the intercache path 52 A or 52B to the transfer control unit 7B or 7D by controlling the transfer LSI 51. It should be noted that transfer of data through the intercache paths 52A or 52B may be performed by DMA (Direct Memory Access).

A PBC 12 is provided between the disk control units 13A and storage devices 24 on each fibre channel loop 22. The PBC 12 on the fibre channel loop 22 connected with the storage devices 24A, 24B is connected through an inter-PBC interrupt path 54 with a PBC 22 on a separate fibre channel loop 22 connected with separate storage devices 24C, 24D. Also, the PBC 12 on the fibre channel loop 22 connected with the storage devices 24 is connected through an inter-PBC substitution path 56 with a PBC 22 on a separate fibre channel loop 22 connected with the same storage device 24.

Each PBC 12 is connected through a PBC control line with the transfer control unit 7 of the CTL 5 that is connected with the fibre channel loop 22 on which this PBC is provided. For example, the PBC 12A1 that is present on the fibre channel loop 22A is connected with the transfer control unit 7A (for example the transfer LSI 51 thereof) through the PBC control line 23. The transfer control unit 7A can control passage of data flowing through the fibre channel loop 22A to the CTL 5A or the storage device 24A, flow of the data flowing through the fibre channel loop 22A to a separate fibre channel loop 22E through the inter-PBC interrupt path 54A and PBC 12B2 and flow of data flowing through the fibre channel loop 22A to a separate fibre channel loop 22B through the inter-PBC substitution path 56A and PBC 12C1, by transmitting a control signal to the PBC 12A1 through the PBC control line 23.

Figure 2:
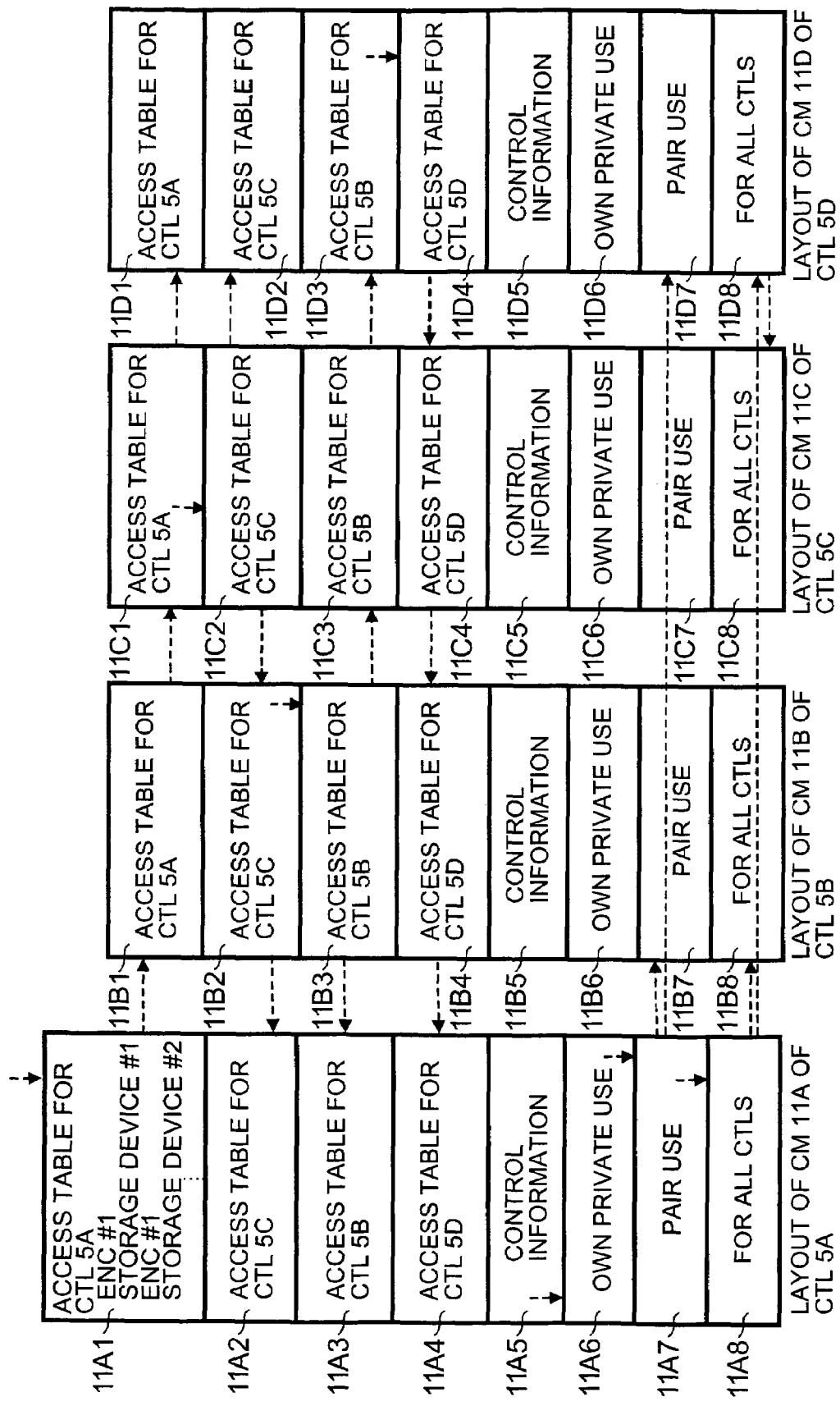
FIG. 2 shows an example of the layout of the CMs provided in the CTLs.

FIG. 2 shows an example of the layout of the CMs provided at each CTL.

The characteristic features of the constructions of CM 11A, 11B, 11C and 11D are the same, so CM 11A will be described as a typical example. The CM 11A comprises an access the table storage region 11A1 for the CTL 5A, an access table storage region 11A2 for the CTL 5C, an access table storage region 11A 3 for the CTL 5B, an access table storage region 11A4 for the CTL 5D, a control information storage region 11A5, its own private storage region 11A6, a pair storage region 11A7 and a storage region 11A8 for all the CTLs.

The characteristic features of the access tables that are stored in the storage regions 11A1, 11A2, 11A3 and 11A4 are the same, so 11A1 will be described as typical example. The access table storage region 11A1 for the CTL 5A is a region in which is stored an access table in which information is written relating to which storage device 24 can be accessed by the CTL 5A. In the access table, for example as shown in FIG. 2, there are recorded one or more combinations of the number (storage device #) of the storage device that can be accessed by the CTL 5A and number (ENC #) of the enclosure 21 wherein the storage device is provided. A set of enclosure number and storage device number can be automatically registered in accordance with the fibre channel rules by the transfer control unit 7A.

The control information storage region 11A5 is a region in which control information is stored that is referenced by the transfer control unit 7A. The control information may include for example the LDEV number and an enclosure number-storage device number conversion table. LDEV means a logical storage device that is provided on one or a plurality of storage devices 24. The LDEV number is an number for identifying the LDEV. A host device 1 can transmit an I/O request including the LDEV number of an LDEV that is for example a data writing destination or reading source. In this case, the transfer control unit 7A can identify the enclosure number and storage device number corresponding to an LDEV number by referencing the conversion table using the LDEV number contained in the I/O request. In addition, the transfer control unit 7A can identify which CTL 5 is capable of accessing a specified storage device 24 from its enclosure number and storage device number, by referencing the access table respectively stored in the storage regions 11A1 to A4, using the specified enclosure number and storage device number.

The CM's own private storage region 11A6 is a region in which data is stored that is employed solely by the CTL 5A. For example, when the transfer control unit 7A determines that the access destination specified in an I/O request from the host device 1A is the storage device 24A or 24B, it secures a cache region in its own private storage region 11A6 and stores write data or read data in this cache region. In other words, the transfer control unit 7A transfers the data stored in its own private storage region 11A6 to the other CTLs 5B and 5D through intercache paths 52A, 52B.

The pair storage region 11A7 is a region in which is stored data that are shared between the CTL 5A and a CTL that forms a pair therewith. For example, if the transfer control unit 7A determines that the access destination specified in an I/O request from the host device 1A is the storage device 24C or 24D, it secures a cache region in the pair storage region 11A7 and gives instructions for the securing of a cache region in the CTL 5B or 5D through the intercache path 52. The transfer control unit 7A then writes write data in the cache region of the pair storage region 11A7 and transmits this write data through the intercache path 52A or 52B to the CTL 5B or 5D. The write data is thereby written in both the CM 11A and CM 11B or 1D. It should be noted that, contrariwise, when the transfer control unit 7A receives instructions for securing a cache region from the CTL 5B or 5D, it secures a cache region in the pair storage region 11A7 and can store the data received from the CTL 5B or 5D in this cache region that has thus been secured.

The storage region 11A8 for the CTLs is a region for storing data that is shared by all of the CTLs 5A to 5D. The data that is stored in this storage region 11A8 is for example written in the storage region 11B8 for all the CTLs of the CM 11B and the storage region 11D8 for all the CTLs of the CM 11D through the intercache paths 52A and 52B. Also, the data written in the storage region 11D8 is transferred to the CTL 5C through the intercache path 52D by the transfer control unit 7D and written in the area 11C8 for all the CTLs of the CM 11C.

In this embodiment, the access tables of the CTLs 5 are written to all of the CMs 11A to 11D by the following flow. Giving a description taking the access table for the CTL 5A as a typical example, when the access table for the CTL 5A is written in the storage region 11A1, this access table is written in the storage region 11B1 of the CM 11B through the intercache path 52A, is next written in the storage region 11C1 of the CM 11C through the intercache path 52C, and is finally written in the storage region 11D1 of the CM 11D through the intercache path 52D. This flow series is not restricted to the access table for the CTL 5A but can also be applied to the access tables for the other CTLs, as shown by the dotted arrow in FIG. 2. Also, this flow series can be implemented by setting beforehand, when data are to be written to a given region, to which region of which CM 11 they are to be written, and through which intercache path 52. This setting can be performed by a hardware construction, since the processing for storing the access tables for the CTLs in all of the CMs 11A to 11D can be performed totally by hardware processing. It should be noted that for the above setting a microprogram that is read into the MP 50 of the transfer control units 7 could be provided; in this case, the above processing can be implemented by the microprograms of the MPs 50.

The above is a description of the layout of the storage control system 100. In this storage control system 100, for example processing as described below is performed.

Figure 3:
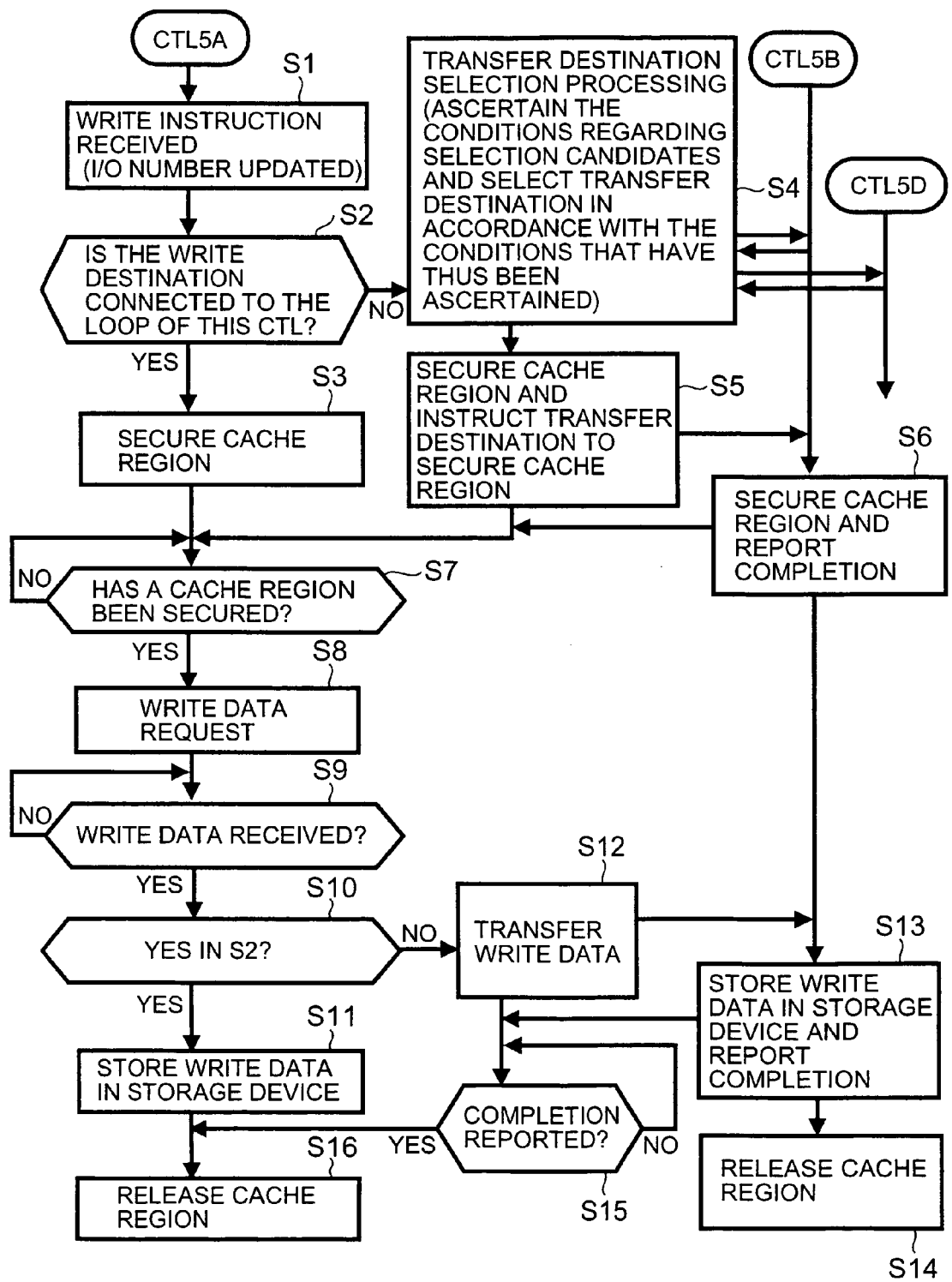
FIG. 3 shows an example of the processing flow that is performed when an I/O request constituting a write instruction is received by a CTL 5A.

FIG. 3 shows an example of the processing flow that is performed when the CTL 5A receives an I/O request constituting a write instruction.

When the CTL 5A receives an I/O request from the host device 1A, the protocol chip 3A gives instructions for securing of a cache region in the transfer control unit 7A and the transfer control unit 7A updates (step S1) its number of unprocessed I/O requests (hereinbelow termed the unprocessed I/O request number). The number of unprocessed I/O requests can be stored in the CM 11A. Specifically, for example, the number of unprocessed I/O requests can be stored in the CM 11A's own private storage region 11A6 or storage region 11A8 for all the CTLs. If the number of unprocessed I/O requests is stored in the storage region 11A8 for all the CTLs, this number of unprocessed I/O requests is written to all of the other CM 11B to 11D. The other CTL 5B to 5D can identify how many unprocessed I/O requests are in the CTL 5A by interrogating the CTL 5A concerning the number of unprocessed I/O requests or by referencing the number of I/O requests of the CTL 5A written in the storage region for all the CTL of their own CM 11.

The transfer control unit 7A identifies (S2) which CTL can access a specified storage device by specifying a storage device that is a write destination for write data, by referencing the information (for example the LDEV number) contained in the write instruction or the access table for the CTLs.

If, as a result of the decision of S2, the transfer control unit 7A identifies that the CTL 5A is capable of access (YES in S2), the transfer control unit 7A secures (S3) a cache region in the CM 11A (for example its own private storage region 11A6), and reports completion of securing of the cache region to the protocol chip 3A.

When the protocol chip 3A receives a report of completion of securing a cache region (YES in S7), the protocol chip requests (S8) write data from the host device 1A. If, in response thereto, write data is sent (YES in S9) from the host device 1A, the transfer control unit 7A stores this write data in the cache region that was secured in S3.

After this, storage processing of the write data is performed (YES IN S10 and S11). For example, the transfer control unit 7A gives instructions to the disk control unit 13A to write data in a storage device (storage device constituting the write destination for the write data) specified in S2. In response to this instruction, the disk control unit 13A reads the write data from the cache region secured in S3 and writes this write data to the storage device 24A or 24B specified in S2 through the fibre channel loop 22A or 22C and, after this process has been completed, reports completion of storage to the transfer control unit 7A.

In response to this report, the transfer control unit 7A releases the cache region secured in S3 (S16).

If, as a result of the decision in S2, it is found that the CTL 5B and 5D can perform access (NO in S2), the transfer control unit 7A executes transfer selection processing (S4). In this S4, for example the transfer control unit 7A ascertains the conditions relating to CTL 5B and 5D (for example traffic condition of the fibre channel loops 22E to 22F) and, based on the condition which has thus been ascertained, selects which of the CTL 5B and 5D is to be the transfer destination. As a more specific example, for example the transfer control unit 7A, by a method such as interrogating the CTL 5B and 5D concerning their unprocessed I/O numbers, specifies the unprocessed I/O number of the CTL 5B written to the CM 11B by the CTL 5B and the unprocessed I/O number of the CTL 5D written to the CM 11D by the CTL 5D, compares the two specified unprocessed I/O numbers and selects the CTL that has the smallest unprocessed I/O number as the transfer destination. In this case, the CTL 5B is assumed to be selected as the transfer destination.

The transfer control unit 7A secures a cache region in the CM 11A (for example pair storage region 11A7) and gives instructions (S5) to the transfer control unit 7B through the intercache path 52A for securing a cache region. In response to these instructions, the transfer control unit 7B secures a cache region in the CM 11B (for example the pair storage region 11B7) and reports (S6) to the transfer control unit 7A completion of securing of the cache region, through the intercache path 52A.

After S6, the processing of S7 to S9 is performed. Thereafter, in the case of NO in S2 (NO in S10), the transfer control unit 7A reads the write data from the cache region secured in S3 and transfers (S12) the write data which has thus been read to the CTL 5B. In this way, this write data is stored in the cache region on the CM 11B which was secured in S6. It should be noted that, in this S12, the transfer control unit 7A may report to the transfer control unit 7B which storage device was specified in S2 (for example the set of enclosure number and storage device number).

After this, storage processing of write data is performed (S13). For example, the transfer control unit 7B gives instructions to the disk control unit 13B for writing of data to the storage device (storage device constituting the write destination of the write data) specified in S2. In response to these instructions, the disk control unit 13A reads the write data from the cache region secured in S6 and writes this write data to the storage device 24C or 24D specified in S2 through the fibre channel loop 22B or 22D and, after completion thereof, reports completion of storage to the transfer control unit 7B. In response to this report, the transfer control unit 7B releases the cache region that was secured on the CM 11B and reports completion of storage to the transfer control unit 7A through the intercache path 52A.

When the transfer control unit 7A receives the report of completion of storage from the transfer control unit 7B (YES in S15), it executes S16 described above.

Figure 4:
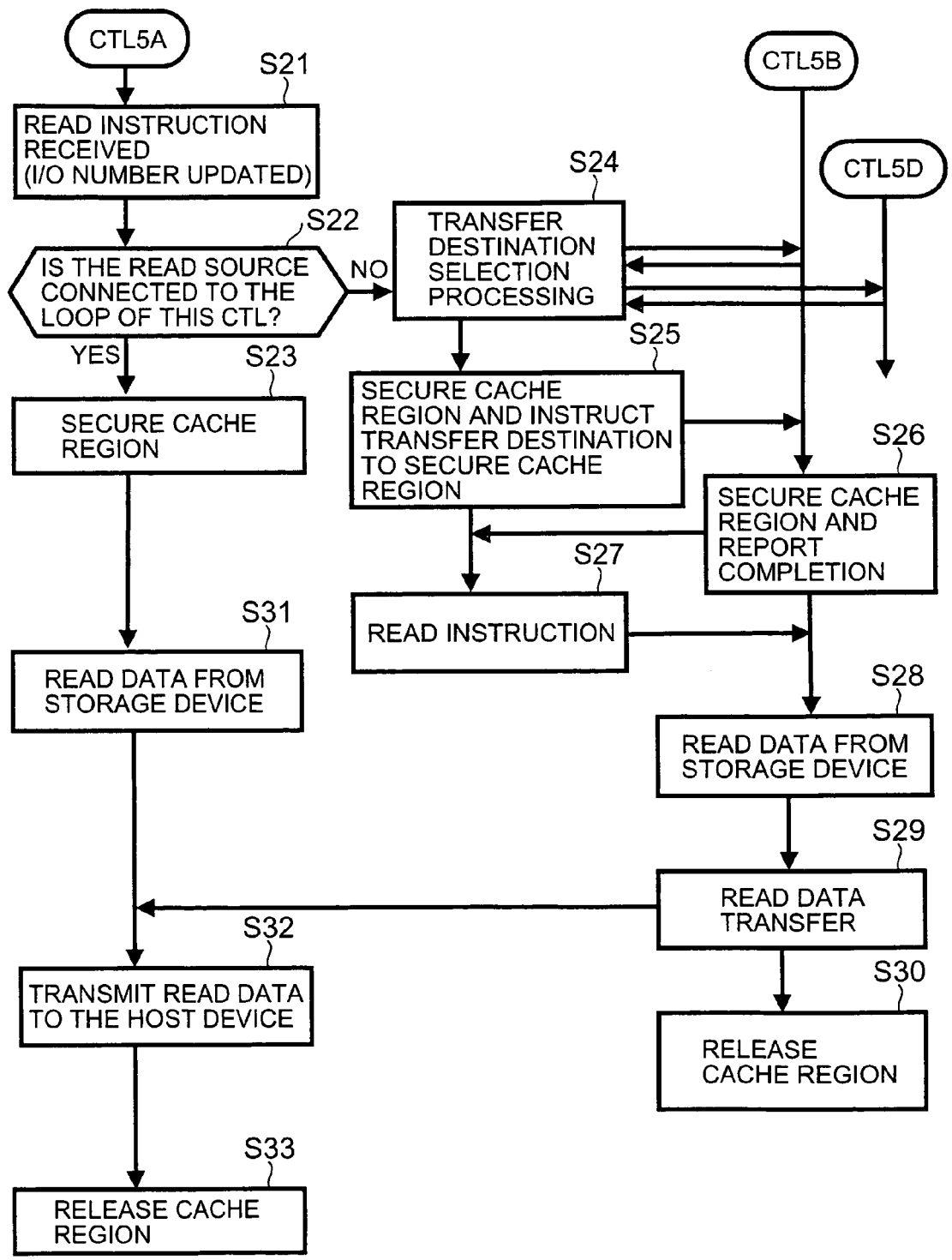
FIG. 4 shows an example of the processing flow that is performed when an I/O request constituting a read instruction is received by the CTL 5A.

FIG. 4 shows an example of the processing flow that is performed when the CTL 5A receives an I/O request constituting a read instruction.

When the CTL 5A receives an I/O request from a host device 1A, the protocol chip 3A gives instructions for a securing a cache region to the transfer control unit 7A and the transfer control unit 7A updates (S21) the unprocessed I/O request number on the CM 11A.

By referencing the information (such as for example the LDEV number) contained in the read instruction and/or the access table for the CTLs, the transfer control unit 7A specifies the storage device that is to be the data reading source, and ascertains (S22) which CTL is capable of accessing the specified storage device.

If, as a result of this decision in S22, it is found that the CTL 5A is capable of access (YES in S22) the transfer control unit 7A secures (S23) a cache region in the CM 11A (for example its own private storage region 11A6).

After this, data reading processing is performed (S31). For example, the transfer control unit 7A gives instructions for reading the data from the storage device specified in S22 to the disk control unit 13A. In response to this instruction, the disk control unit 13A reads the data from the specified storage device and stores the read data that has thus been read in the cache region that was secured in S23.

The transfer control unit 7A gives instructions to the protocol chip 3A to transmit the read data in this cache region to the host device 1A. The protocol chip 3A acquires the read data from the cache region, transmits (S32) this read data to the host device 1A and reports completion of transmission to the transfer control unit 7A.

In response to the report of completion of transmission from the protocol chip 3A, the transfer control unit 7A releases (S33) the cache region that was secured on the CM 11A.

If, as a result of the decision in S22, it is found that the CTLs 5B and 5D are capable of access (NO in S22), the transfer control unit 7A executes transfer destination selection processing (S24) in the same way as in the case of S4. We shall assume that the CTL 5B is selected as the transfer destination.

The transfer control unit 7A secures a cache region in the CM 11A (for example the pair storage region 11A7) and gives instructions (S25) through the intercache path 52A for securing a cache region to the transfer control unit 7B.

In response to these instructions, the transfer control unit 7B secures a cache region in the CM 11B (for example the pair storage region 11B7) and reports (S26) completion of securing the cache region to the transfer control unit 7A through the intercache path 52A.

In response to S26, the transfer control unit 7A transmits (S27) a data read instruction to the transfer control unit 7B through the intercache path 52A. It may be arranged for the transfer control unit 7A to report to the transfer control unit 7B in this S27 which storage device was specified in S22 (in the form of for example the set of enclosure number and storage device number).

Data reading processing is performed (S28) in response to this read instruction. For example, the transfer control unit 7B may give instructions to the disk control unit 13B for reading data from the storage device specified in S22. The disk control unit 13B reads data from the specified storage device in response to this instruction and stores the read data that has thus been read in the cache region that was secured in S26.

The transfer control unit 7B transfers (S29) the read data that was stored in the cache region to the transfer control unit 7A through the intercache path 52A. The read data is thereby written in the cache region there was secured in the CM 11A. After S29, the transfer control unit 7B releases (S30) the cache region that was secured in S26.

After S29, the processing of S32 and S33 described above is performed.

With the embodiment described above, the four CTLs 5A to 5D can respectively access storage devices through a fibre channel loop 22 that is connected with the CTL in question, instead of sharing a single fibre channel loop 22 by a plurality of CTLs 5.

Figure 5A:
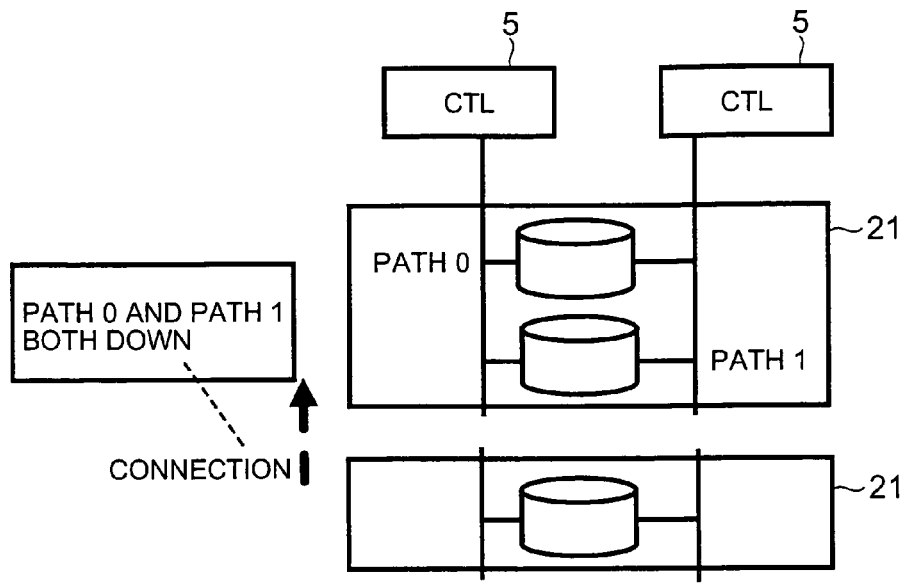
FIG. 5A is a diagram showing the effect that can be obtained if there are two CTLs and if a storage device group enclosure is additionally provided.
Figure 5B:
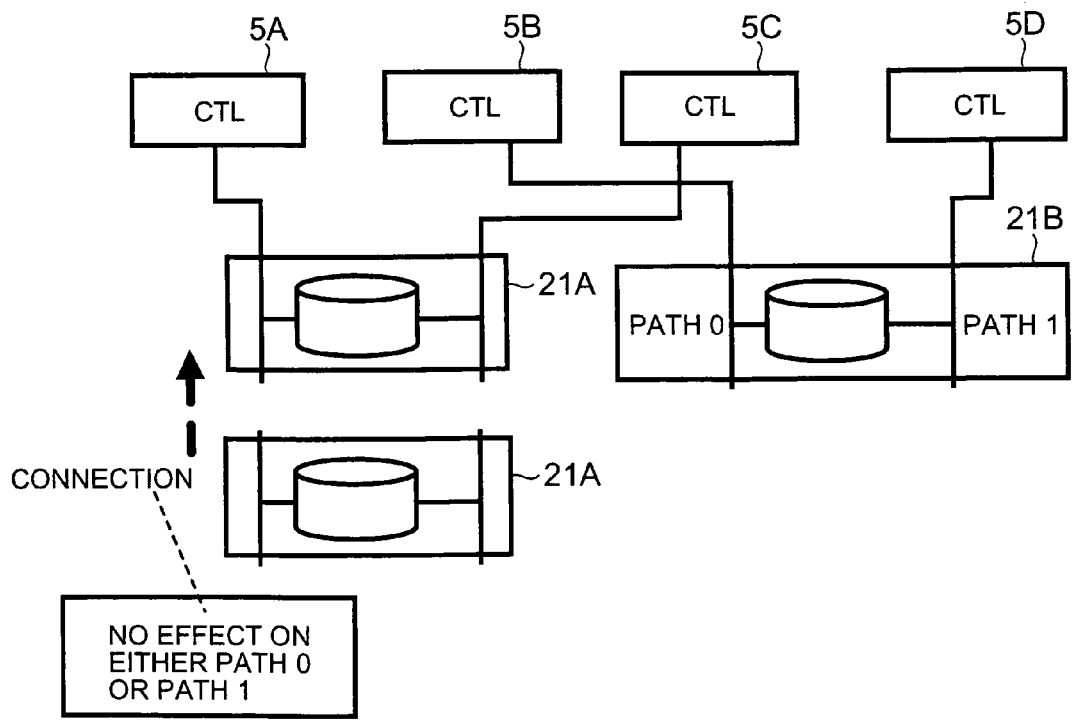
FIG. 5B is a diagram showing the effect that can be obtained if a storage device group enclosure is additionally provided in a storage control system according to this embodiment.

Also, with the embodiment described above, when an operation to additionally install or remove a storage device group 21 is performed, adverse effects due to this operation can be avoided. Specifically, as shown by way of example in FIG. 5A, when a single storage group enclosure 21 is connected with two CTLs 5, path 0 and path 1 go down if another storage device group enclosure 21 is linked up with the first-mentioned storage device group enclosure 21. However, with the storage control system 100 according to this embodiment, as shown by way of example in FIG. 5B, even if another enclosure 21A is linked up with the first-mentioned storage device group enclosure 21A, the path 0 and the path 1 of the storage devices present in the storage device group enclosure 21B do not go down. The CTLs 5B and 5D can therefore access storage devices in the storage device group enclosure 21B without being affected by addition or removal of this storage device group enclosure 21A.

The following examples of modification of this embodiment may be considered.

As shown in FIG. 6, the CTL 5 executes (S50) with prescribed timing decision processing regarding the method of access i.e. as to which of the intercache path 52, inter-PBC interrupt path 54 and inter-PBC substitution path 56 should be used to access the storage device. As the prescribed timing there may be selected for example the timing of the processing of S2 or S22 described above or the timing of access of the storage device through the fibre channel loop 22 that is connected with the CTL 5 in question. Herein below, the CTL 5A will be described as a typical example.

If the CTL 5A identifies that the fibre channel loop 22E or 22G of the CTL 5B is being used, if it detects that the usage rate (in other words the degree of congestion) of the intercache path 52A is lower than a prescribed value (which is for example stored in the control information storage region 11A5 of the CM 11A) or if it detects that at least one storage device 24A or 24B is connected, decides on (S51A) data transfer to the CTL 5B through the intercache path 52A.

Also, if access to the storage device 24C has been specified, if the CTL 5A detects at least one of the following (1) to (3):

(1) the usage rate (i.e. the degree of congestion) of the intercache path 52A is higher than the prescribed value or a fault has occurred on the intercache path 52A;

(2) one or other of the storage devices 24A and 24B is not connected with the CTL 5A; or (3) the usage rate of the fibre channel loop 22E is lower than the prescribed value;

the CTL 5A decides on (S51B) access of the storage device 24C through the inter-PBC interrupt path 54A by controlling the PBC 12A1. In this case, there is no need to issue an instruction to the CTL 5B through the intercache path 52A, so the load of the MP 50 of the transfer control unit 7A can be reduced.

Also, if access to the storage device 24A has been specified, if the CTL 5A detects at least one of the following (A) to (D):

(A) the usage rate of the fibre channel loop 22A is higher than the prescribed value;

(B) the usage rate of the fibre channel loop 22B is lower than the prescribed value;

(C) the usage rate of the fibre channel loop 22B is lower than the usage rate of the fibre channel loop 22A; or (D) a fault has occurred on the fibre channel loop 22A but no fault has occurred on the fibre channel loop 22B;

the CTL 5A decides on (S51C) access of the storage device 24A through the inter-PBC substitution path 56A by controlling the PBC 12A1.

The above processing of 51A to 51C can also be applied to the other CTLs.

Although preferred embodiments and practical examples of the present invention have been described above, these are merely given as examples illustrative of the present invention and the scope of the present invention is not intended to be restricted solely to these embodiments and modifications thereof. The present invention can be put into practice in various other modes. For example, although the case where the number of CTLs was four was described by way of example above, the present invention could also be applied to the case where the number of CTLs is four or more (for example 2N or more (where N≧3)). Also, the connection layout of the plurality of CTLs 5 or plurality of fibre channel loops is not restricted to the layout shown by way of example in FIG. 1. Specifically, more or fewer intercache paths 52, inter-PBC interrupt paths 54 and inter-PBC substitution paths 56 could be employed.

What is claimed is:

1. A storage control system comprising:
   a first controller connected through a first access route to one or more first storage devices;
   a second controller connected through a second access route to one or more second storage devices;
   a third controller connected through a third access route to said one or more first storage devices; and
   a fourth controller connected through a fourth access route to said one or more second storage devices, wherein:
   said first controller is connected to said second controller and a host device that transmits an access instruction, and receives said access instruction from said host device, and if the access destination in accordance with said access instruction is one of said one or more second storage devices, said first controller outputs a first access request that is a request to access said second storage device to said second controller,
   said second controller accesses said second storage device through said second access route in response to said first access request from said first controller,
   said third controller is connected to said fourth controller and said host device; and receives said access instruction from said host device, and if the access destination in accordance with said access instruction is the second storage device, said third controller outputs a second access request that is a request to access said second storage device to said fourth controller,
   said fourth controller accesses said second storage device through said fourth access route in response to said second access request from said third controller,
   said first controller stores information relating to first and second storage devices accessible by each controller, and said each controller determines whether a to-to-access destination in accordance with said access instruction is one of said accessible first storage devices or one of said accessible second storage device by referencing said information;
   said first to fourth controllers respectively comprise memory for storing data, and a transfer control unit that controls transfer of data stored in said memory to a separate memory through a data transfer path,
   each memory comprises a first memory region that stores first access control information constituting information relating to a first storage device accessible by said first controller, a second memory region that stores second access control information constituting information relating to the second storage device accessible by said second controller, a third memory region that stores third access control information constituting information relating to the first storage device accessible by said third controller, and a fourth memory region that stores fourth access control information constituting information relating to the second storage device accessible by said fourth controller,
   said first to fourth controllers respectively write said access control information constituting information relating to the storage device that are accessible in the memory regions corresponding to the controllers, and
   the transfer control units, if access control information is written to a memory region corresponding to the controller of the transfer control unit, write said access control information through said data transfer path also in a memory region of a separate memory corresponding to said memory corresponding to the controller.

2. A storage control system comprising:
   a first controller connected through a first access route to one or more first storage device;
   a second controller connected through a second access route to one or more second storage devices;
   a third controller connected through a third access route to said one or more first storage devices; and
   a fourth controller connected through a fourth access route to said one or more second storage devices, wherein:
   said first controller is connected to said second controller and a host device that transmits an access instruction, and receives said access instruction from said host device, and if the access destination in accordance with said access instruction is one of said one or more second storage device, said first controller outputs a first access request that is a request to access said second storage device to said second controller,
   said second controller accesses said second storage device through said second access route in response to said first access request from said first controller,
   said third controller is connected to said fourth controller and said host device; and receives said access instruction from said host device, and if the access destination in accordance with said access instruction is the second storage device, said third controller outputs a second access request that is a request to access said second storage device to said fourth controller,
   said fourth controller accesses said second storage device through said fourth access route in response to said second access request from said third controller,
   said first controller comprises a first memory for storing data and a first transfer control unit that controls the transfer of data,
   said second controller comprises a second memory for storing data and a second transfer control unit that controls data transfer and that is connected to said first transfer control unit through a data transfer path, said first controller or said second controller writes data in a memory of the controllers and also writes said data in a separate memory of the controllers through said data transfer path, under the control of said first transfer control unit and said second transfer control unit,
a first switch device is provided between said first access control unit and said one or more first storage devices,
a second switch device is provided between said second access control unit and said one or more second storage devices, connected through a separate data transfer path with said first switch device, and
said second controller controls said second switch device and accesses said first storage device through said first switch device and said first access route.

3. The storage control system according to claim 2, wherein said second controller is connected to said host device and detects a failure of access of said one or more second storage devices, and if said failure is detected and if an access instruction for accessing the first storage device has been received from said host device, said second controller controls said second switch device, and accesses said first storage device through said first switch device and said first access route.

* * * * *